Sept. 20, 1966 W. R. SPARK 3,273,393
BATHYTHERMOGRAPH
Filed March 24, 1964 6 Sheets-Sheet 1
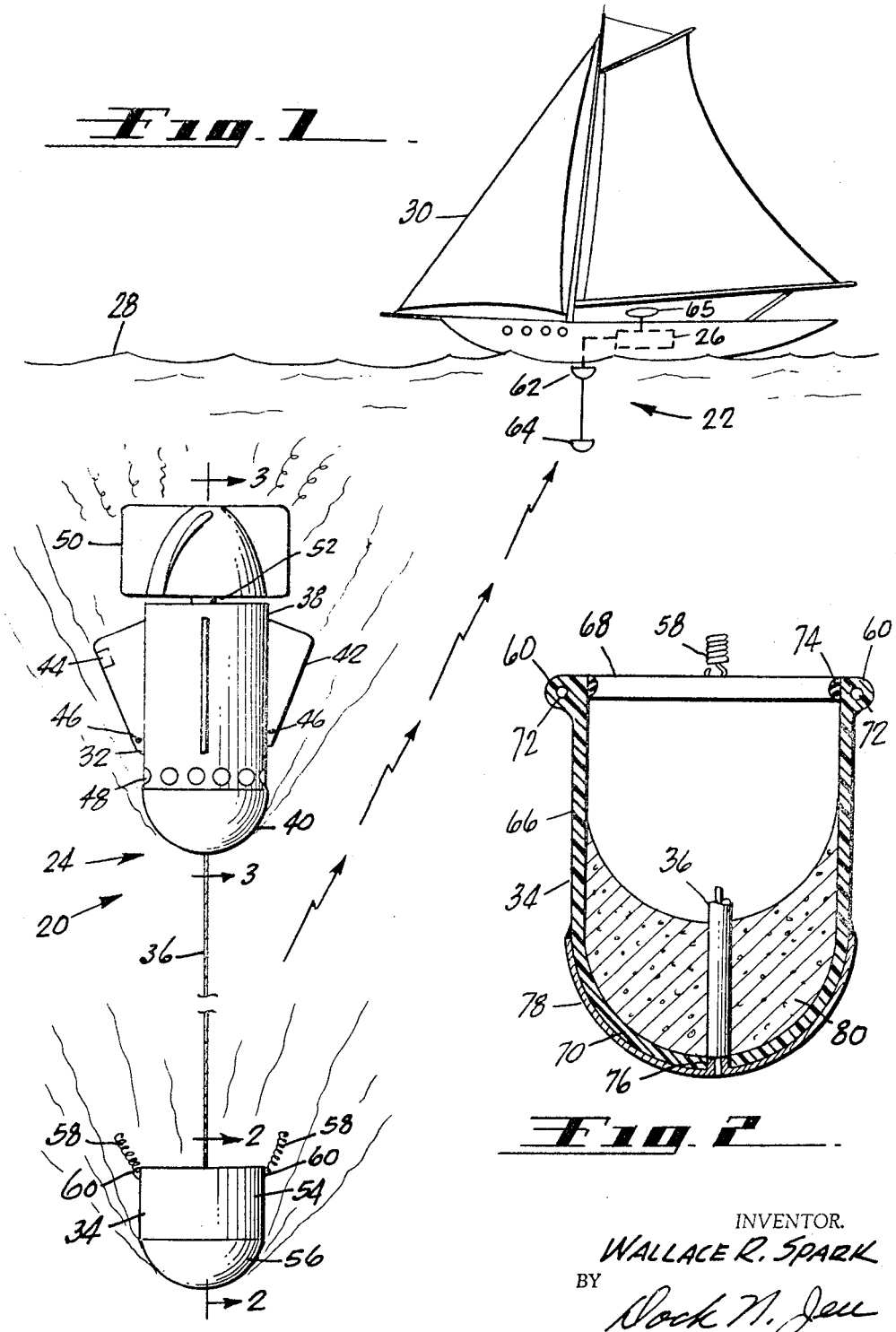
INVENTOR.
WALLACE R. SPARK
BY
Dock N. Jeu
AGENT

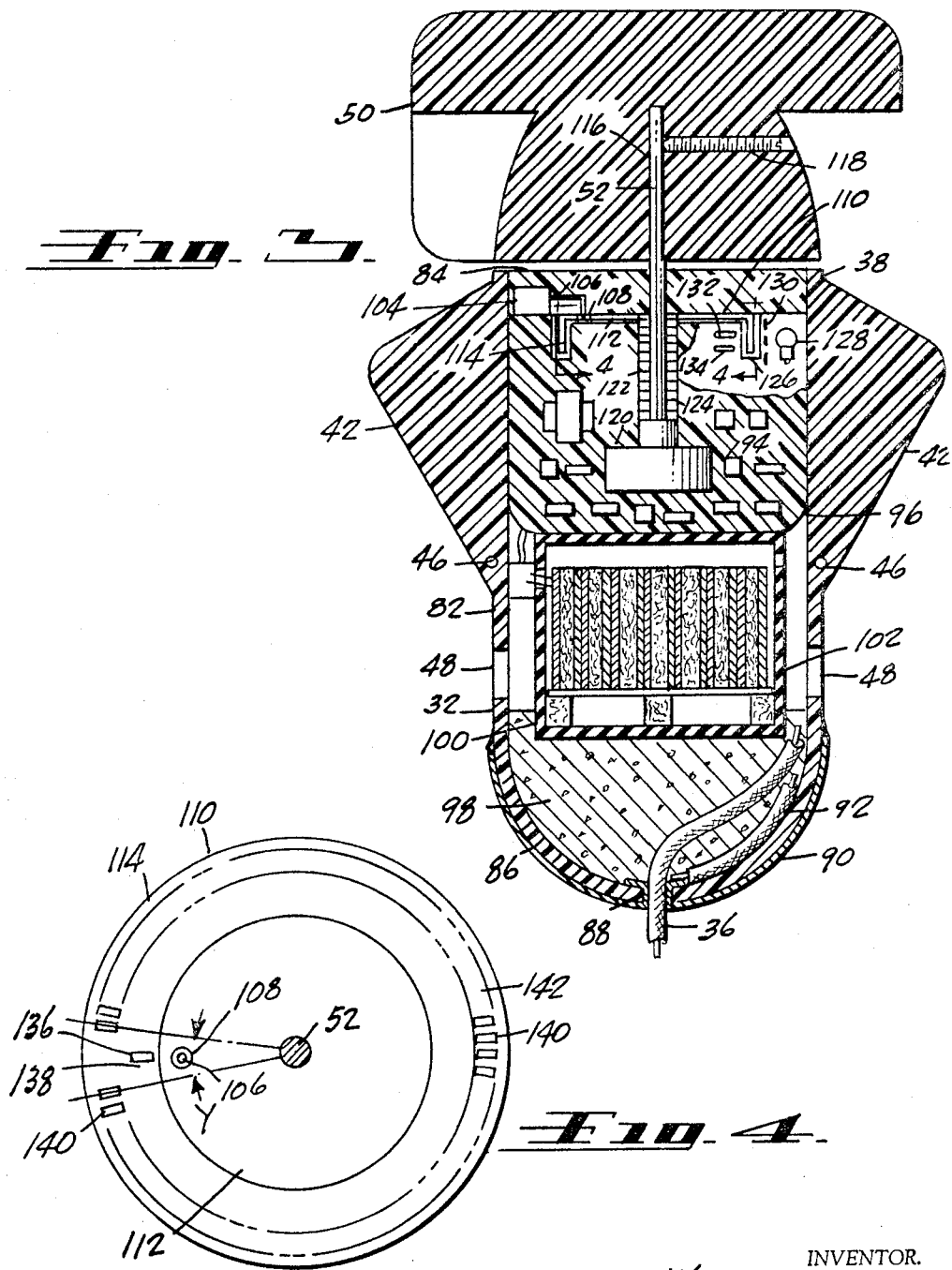

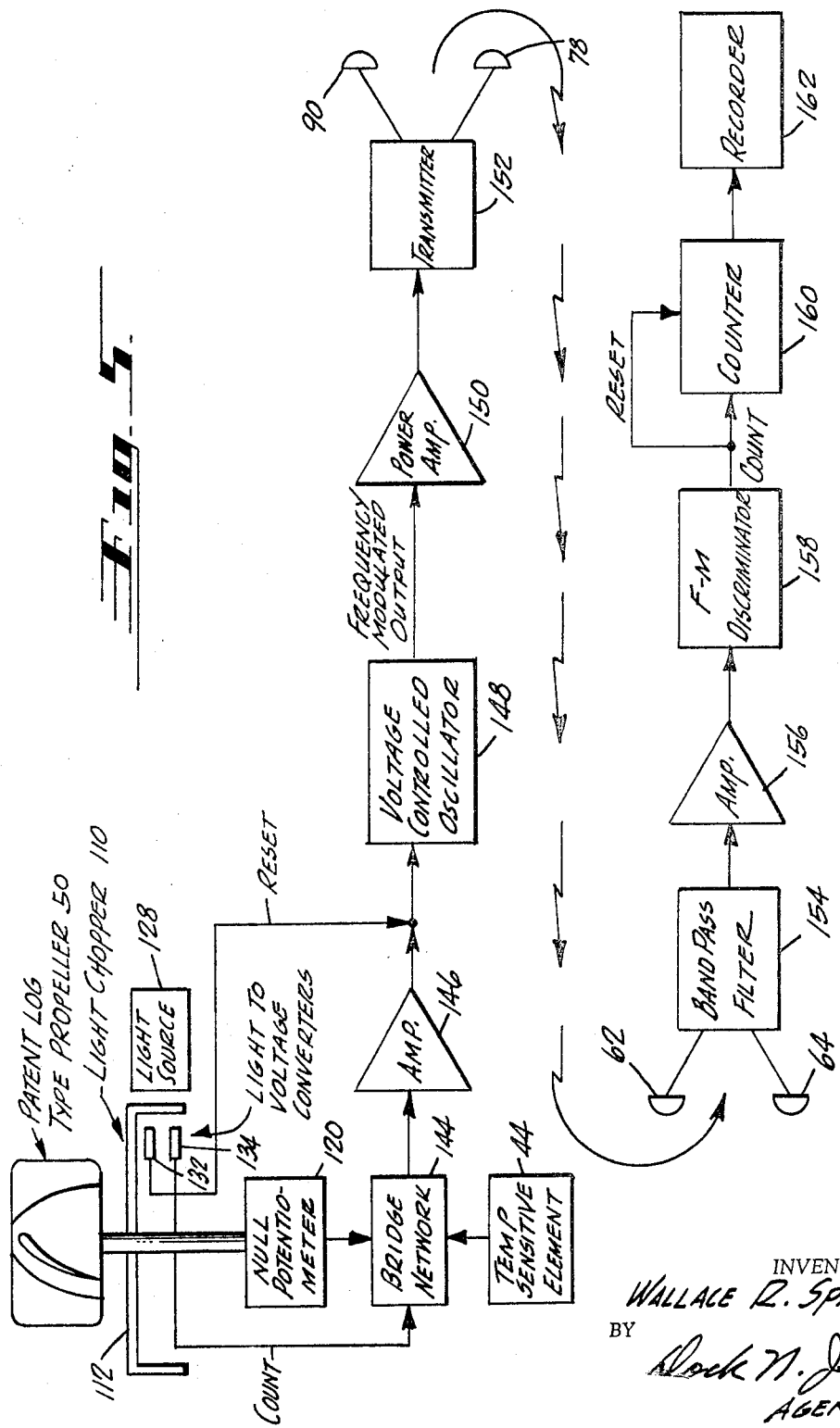

Sept. 20, 1966 W. R. SPARK 3,273,393
BATHYTHERMOGRAPH
Filed March 24, 1964 6 Sheets-Sheet 4
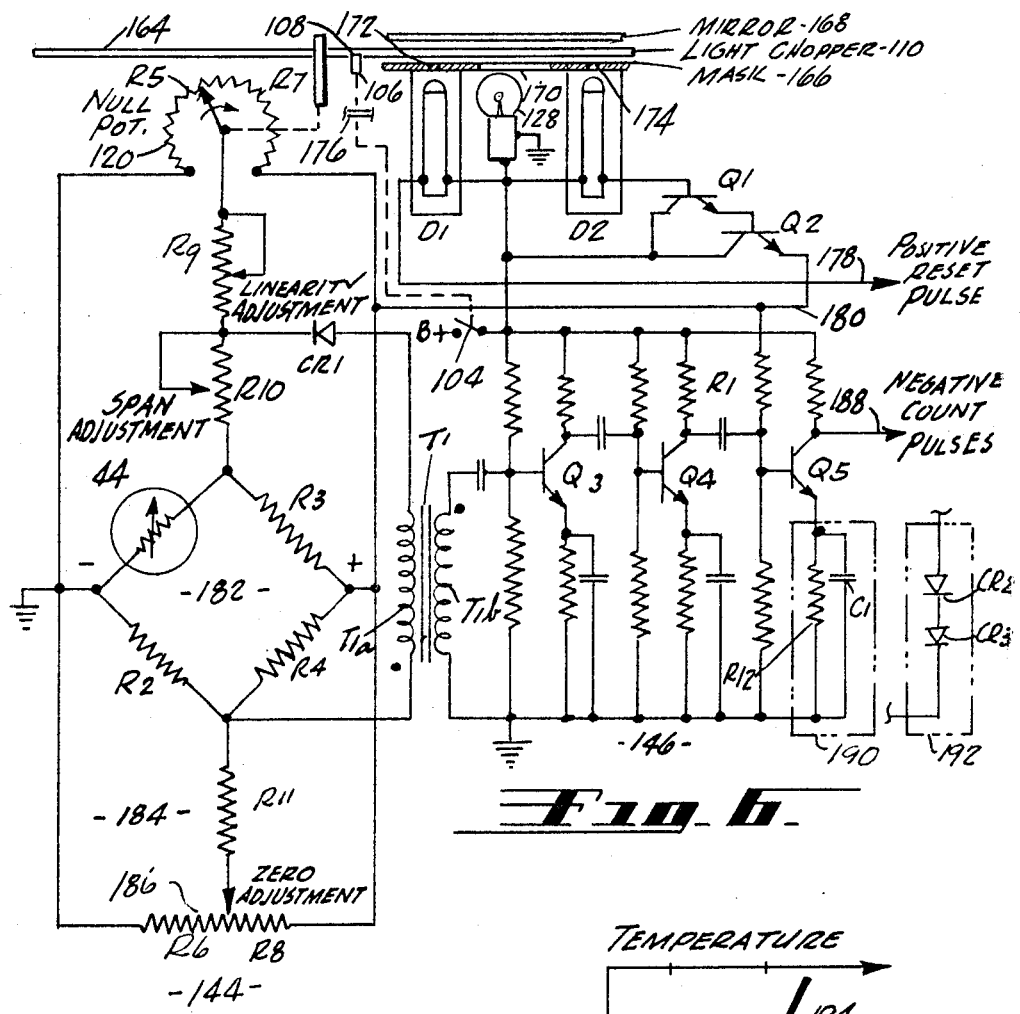
Fig. 6.
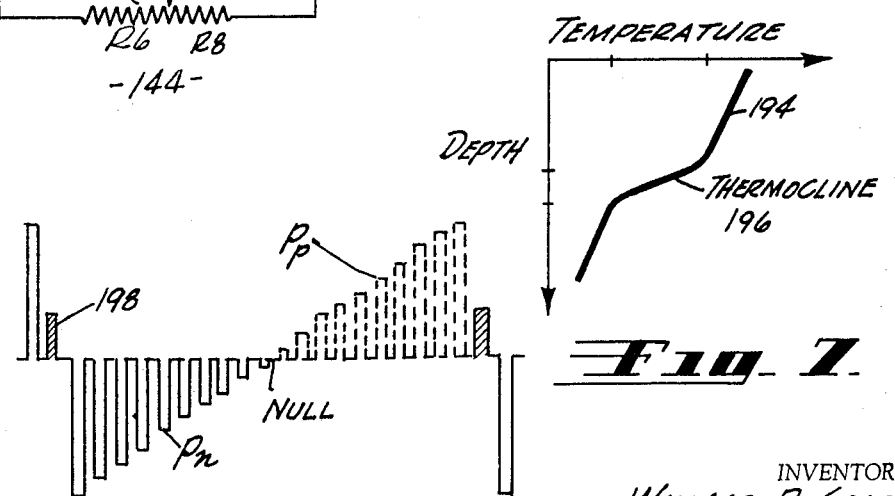
Fig. 7.
Fig. 8.
INVENTOR.
WALLACE R. SPARK
BY Dock N. Jen
AGENT

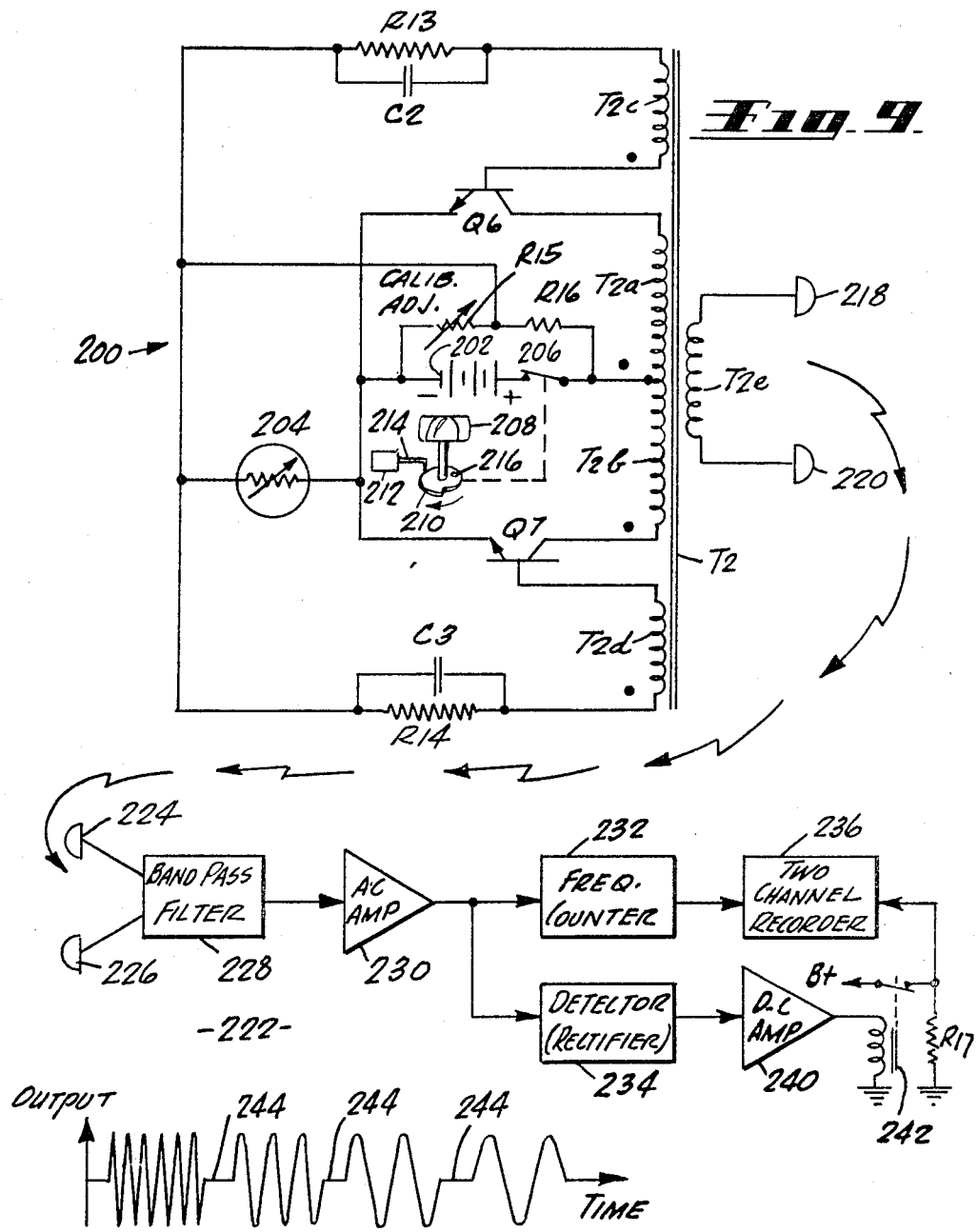

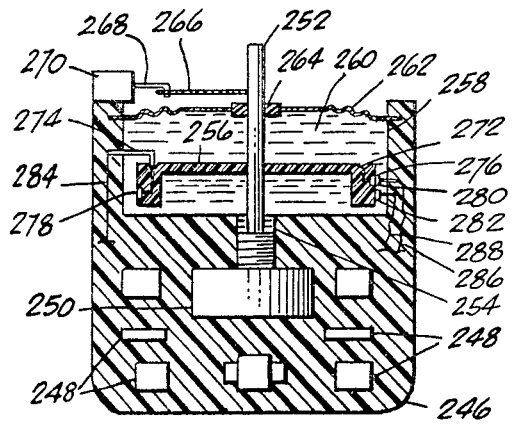
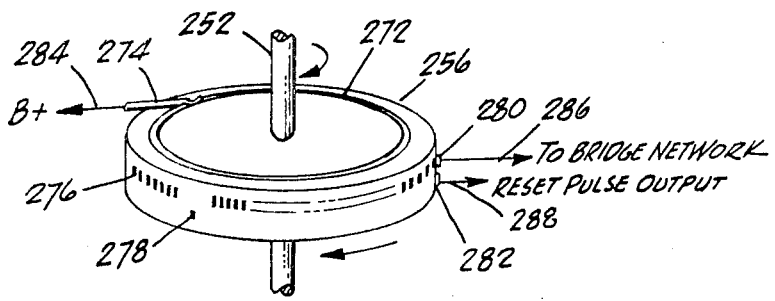

United States Patent Office 3,273,393
Patented Sept. 20, 1966

3,273,393
BATHYTHERMOGRAPH
Wallace R. Spark, Santa Monica, Calif., assignor to Douglas Aircraft Company, Inc., Santa Monica, Calif.
Filed Mar. 24, 1964, Ser. No. 354,325
20 Claims. (Cl. 73—344)

My present invention relates generally to means for measuring and recording the water temperature at different depths of a body of water. More particularly, the invention relates to a bathythermograph which can be used to chart the water temperatures at reasonably closely spaced depth intervals of, for example, selected areas of the ocean.

In sonar detection equipment used on board aircraft or ships, the pattern of penetration of the sonar acoustic signals in a large body of water such as the ocean can be determined and interpreted with the establishment and use of temperature versus depth profile data of the ocean. As is well known, the motion of a particular point on a wavefront of acoustic energy may be represented by a sonic ray and alterations in direction of the sonic ray are due to changes in its propagation velocity in the water medium. These changes in propagation velocity within a substantially homogeneous and continuous medium such as the ocean are, of course, dependent largely upon variations of water temperature with depth and causes resultant bending of the sonic ray path.

In establishing the temperature versus depth profile data for a body of water such as the ocean, it is relatively easy to make such measurements near the ocean surface from on board a ship but this becomes progressively more difficult with increasing depth. This is particularly true where it is necessary to make a relatively large number of measurements rapidly and acurately over a considerable depth. One way of measuring water temperature for different depths is to reel out an insulated electrical cable attaching a suitably weighted capsule mounting a temperature sensing element. As the cable is played out to different depths, the temperatures at these depths are electrically recorded on board the ship. This is a cumbersome method and requires an extremely large amount of (long) cable which is clearly impractical where great ocean depths are probed. Further, strong ocean currents would move the capsule laterally to and fro even though it maintains a fairly uniform vertical descent rate. This is misleading in determining capsule depth from the length of cable played out because of the unknown and possibly varying strengths and/or changing directions of the ocean currents.

It is an object of my invention to provide a means for measuring and recording the temperature at relatively closely spaced intervals of depth of any selected area of a body of water without requiring the use of a long length of cable.

Another object of this invention is to provide a device for establishing progressive depths of a body of water simultaneously with the water temperatures at the different depths.

A further object of this invention is to provide a means for measuring the temperatures at different depths of a body of water and simultaneously transmitting such information to a remotely located recorder.

A still further object of the invention is to provide a small and compact bathythermosphere unit which is capable of accurately measuring the temperatures at progressively increasing depths of a body of water and continuously transmitting such data to a remotely located surface vessel.

Briefly, and in general terms, the foregoing and other objects are preferably accomplished by providing a bathythermograph comprising a transmitting system for measuring and transmitting temperature versus depth profile data of a body of water, and a remotely located receiving system for receiving such data and recording the same. The transmitting system includes a bathythermophere unit which can be dropped into the body of water and carries temperature sensing means, depth establishing means and transmitter means for radiating the temperature and depth data in the form of characteristically varying signals from the unit. The receiving system includes a receiver and recorder normally carried on board a ship to receive the signals radiated from the bathythermosphere unit and derive the temperature and depth data therefrom for recording such information on the recorder.

My invention will be more fully understood and other features and advantages thereof will become apparent from the following detailed description of illustrative examples of the invention to be taken in conjunction with the accompanying drawings, in which:

FIGURE 1 is a perspective view which illustrates the general use and operation of my invention;

FIGURE 2 is a central, longitudinal sectional view of the nose cone of the bathythermosphere unit taken along the line 2—2 as indicated in FIGURE 1;

FIGURE 3 is a central, longitudinal sectional view of the capsule of the bathythermosphere unit taken along the line 3—3 as indicated in FIGURE 1;

FIGURE 4 is an unfolded plan view of a chopper disc as seen taken along the line 4—4 indicated in FIGURE 3;

FIGURE 5 is a block diagram of one form of the bathythermograph;

FIGURE 6 is a circuit diagram which shows details of the circuitry for producing appropriate temperature and depth data signals that can be used to modulate the transmitting system in the bathythermograph shown in FIGURE 5;

FIGURE 7 is a graph which depicts the variation of water temperature versus depth in a body of water such as the ocean;

FIGURE 8 is a graph which illustrates the signal that is produced at the output of the bridge network shown in FIGURE 6;

FIGURE 9 is a circuit diagram of a modified version of the bathythermograph;

FIGURE 10 is a graph which generally illustrates the output signal that is produced from the ttransmitting system portion of the bathythermograph shown in FIGURE 9;

FIGURE 11 is a longitudinal sectional view showing a commutator device which can be used in place of the light chopper in this invention; and FIGURE 12 is a perspective view of the commutator disc shown in FIGURE 11.

FIGURE 1 is a perspective view which generally illustrates the use and operation of my invention. The bathythermograph comprises a transmitting system 20 and a receiving system 22. The transmitting system 20, in one illustrative example, is embodied in a bathythermosphere unit 24. The receiving system 22 is correspondingly embodied in a receiver and recorder unit 26 which provides a visual record of water temperature as given against depth of, for example, ocean 28. The bathythermosphere unit 24, or more simply the bathythermosphere 24, measures the wather depth and its corresponding temperature simultaneously, and this data is telemetered in a regular and essentially continuous manner to the receiver and recorder unit 26, or more simply the receiver 26, which is connected to and carried on board a ship 30.

The bathythermosphere 24 includes a capsule 32 and an associated nose cone 34 which is connected to the capsule 32 by a lead 36 that is of a predetermined length. This length can be anywhere from, say, 1.5 to 30 feet in practice. The capsule 32 has a generally cylindrical body 38 and a hemispherical nose 40. Stabilizing fins 42 which extend radially from the body 38 are longitudinally positioned equiangularly about the body 38 as indicated in FIGURE 1. Three equally spaced fins may be used although four fins 42 are illustratively shown, and a temperature sensitive element (thermistor, for example) 44 is mounted to one of these fins 42. Apertures 46 are located at the lower ends of the fins 42, and somewhat below the ends of the fins 42 are provided a series of ports 48 which are circumferentially spaced equiangularly about the body 38. A patent log type propeller 50 forms the normally upper end of the capsule 32 and is connected to the body 38 thereof by a central, axial shaft 52.

The associated nose cone 34 also has a generally cylindrical body 54 and a hemispherical nose 56. The upper portion of the nose cone 34 is generally hollow and is of a sufficient inner diameter to fit closely about the nose end of the capsule 32 to provide a concentrically fitting cap therefor. There is enough space in the hollow upper portion of the nose cone 34 to accommodate the lead 36 in a coiled condition. The length of the hollow upper portion of the nose cone 34 is such that with the lead 36 coiled therein, the nose cone 34 extends concentrically far up enough on the nose end of the capsule 32 to cover the ports 48 completely when the nose cone 34 is used to cap the nose end of the capsule 32 as during storage of the bathythermosphere 24. At least two coiled springs 58 are normally used during storage to connect two diametrically opposite tabs of the four tabs 60 to corresponding apertures 46 in the fins 42. This secures the nose cone 34 properly to the nose end of the capsule 32 and the lead 36 is safely confined within the hollow upper portion of the nose cone 34. The bathythermosphere 24 is approximately 10 inches long and 4.5 inches in diameter, for example, and the lead 36 is preferably about three feet long in this instance.

The nose 40 of the capsule 32 and the nose 56 of the nose cone 34 each has a carbon or metallic surface which serves as an electrode. The lead 36 is an insulated lead which connects electrically at one end to the electrode surface of the nose cone 34 and at the other end to one side of the output of a transmitter (not shown in FIGURE 1) within the capsule 32. The electrode surface of capsule 32 is similarly connected electrically to the other side of the output of the transmitter. The two electrodes are utilized in the transmitting system 20 to produce an electromagnetic signal which is propagated through the sea water medium to two similarly arranged and spaced electrodes 62 and 64 of the receiving system 22. Generally, the greater the electrode spacing, the greater will be the range of the system. The electromagnetic signal produced in this invention contains appropriate temperature versus depth data or information which is received and utilized by the receiver 26 to yield a record of water temperature as given with respect to depth.

It is well-known that electromagnetic waves radiated by very powerful radio stations have limited depth penetration into the ocean because of interface attenuation and the considerable depth attenuation of sea water on the electromagnetic wave energy. Depth attenuation is generally proportional to the square root of frequency up to the microwave frequencies, and the frequencies radiated by the communications stations in, for example, the common broadcast band are relatively high, being from 50 to 1500 kilocycles per second. However, when lower frequency energy such as under 10 kilocycles per second is directly coupled into sea water by the dipole electrode system of the bathythermosphere 24, a much greater range in depth and other directions is obtained.

Use of the electrode system of the bathythermosphere to couple energy into sea water produces a flux field pattern in which the maximum and null positions of the flux field is dependent upon the resultant vector direction of current flow between the dipole electrodes and hence on the electrode arrangement. The bathythermosphere electrodes couple currents into the sea water for signalling or communication purposes, and similarly arranged electrodes 62 and 64 are desirable for best reception of the electromagnetic signal transmitted by the currents coupled into the sea water. The electromagnetic field penetrates the ocean surface and, if desired, a loop antenna 65 can be used on the ship 30 above the ocean 28 to pick up the electromagnetic signal produced by the bathythermosphere 24. Of course, the loop antenna 65 can also be used immersed in the ocean 28 to pickup the electromagnetic field. Loop sensitivity, however, generally decreases with frequency but the response of spaced electrodes does not.

FIGURE 2 is a central, longitudinal sectional view of the nose cone 34 taken along the line 2—2 as indicated in FIGURE 1. The nose cone 34 comprises a cylindrical, tubular housing 66 having a normally open upper end 68 and a normally closed lower hemispherical end 70. The housing 66 is preferably fabricated of plastic although other noconducting materials may be used. The housing 66 has the tabs 60 located about the open upper end 68 and the tabs 60 each has an aperture 72 through which the normally lower end of one of the springs 58 can be hooked. A soft rubber ring 74 having a semicircular cross section is provided at the upper internal edge of the open end 68. This provides a seal and cushion between the outer cylindrical surface of the body 38 of the capsule 32 when assembled with the inner cylindrical surface of the housing 66.

A small central hole 76 is drilled in the lower hemispherical end 70 of the housing 66 and a carbon or metallic coating 78 is suitably bonded or plated onto the exterior surface of the hemispherical end 70 and on the inner side surfaces of the hole 76. The insulation on the lower end of the lead 36 is then removed so that the exposed end metallic conductor portion can be placed in contact with the coated sides of the hole 76 and is bonded or soldered thereto. An electrical contact is thus achieved between the coating 78 and the lead 36. The lower part of the housing 66 is next filled with concrete or plaster weighting material 80 to provide a proper weight for the nose cone 34. The upper end of the material 80 is preferably concavely shaped to facilitate coiling of the lead 36 therein for storage.

FIGURE 3 is a central, longitudinal sectional view of the capsule 32 taken along the line 3—3 as indicated in FIGURE 1. The capsule 32 has a generally cylindrical, tubular housing 82 which is preferably made of an insulating material such as plastic. The housing 82 has a normally upper open end 84 and a normally lower closed hemispherical end 86. The housing or capsule body 38 has stabilizing fins 42 with apertures 46, and the ports 48. A hole 88 is centrally drilled in the hemispherical end 86 and a carbon or metallic coating 90 is suitably bonded or plated onto the exterior surface of the hemispherical end 86, on the inner side surfaces of the hole 88 and around the edges of the hole 88 on the inner surface of the hemispherical end 86. This coating 90 on the hemispherical end 86 serves as an electrode in the transmitting system 20 (FIGURE 1) as does the coating 78 (FIGURE 2) on the hemispherical end 70 of the nose cone 34.

The lead 36 is passed through the coated hole 88 as indicated in FIGURE 3 but the conducting wire of the lead 36 is, of course, insulated from the coating 90. The coating 90, however, is electrically connected to the conducting wire of a lead 92 which, together with lead 36, is connected to the output of a transmitter of the transmitting system 20 indicated in FIGURE 1. This transmitter, along with other components of the system 20, is located within the housing 82 and is formed from circuit elements 94 which are suitably interconnected. The elements 94 are potted in epoxy in the form of a block 96. Wiring between the elements 94 have been omitted from FIGURE 3 for clarity of illustration.

The inside space of the hemispherical end 86 of the housing 82 is suitably filled with a concrete or plastic weighting material 98 which has an appropriately formed depression 100 to seat the base of a battery 102. The battery 102 is preferably a water activatable battery or it can be a hermetically sealed one. A pressure operated switch 104 connects the output of the battery 102 to supply the circuit elements 94 in the block 96. The block 96 is positioned directly above the battery 102 and both are suitably secured in place by any appropriate means. The switch 104 is adjusted to close the power circuit when the water pressure is that at, for example, six feet. The ports 48 permit the capsule 32 to be quickly filled with water after it is dropped into the ocean 28. This water activates the battery 104 if it is a water activatable battery and causes the switch 104 to be closed to supply power to the elements 94. Water temperature can be easily measured from on board the ship 30 to a depth of six feet, so that temperatures of the ocean 28 down to six feet need not be provided by the bathythermosphere 24 unless, of course, desired.

The water pressure acts against a diaphragm in the switch 104 which causes switch contacts to be closed at an appropriate pressure. At the same time, the diaphragm causes a lever 106 to be fully raised at this pressure. This withdraws the downwardly bent end of the lever 106 from an indexing aperture 108 in light chopper 110. The light chopper 110 is a cup-shaped disc 112 having a downwardly extending flange 114, and is centrally affixed to the shaft 52. The shaft 52 has a flat sided end which is inserted into a correspondingly shaped hole 116 in the propeller 50 and a set screw 118 secures the propeller 50 to the shaft 52. Thus, the propeller 50 is prevented from turning and rotating the shaft 52 because of the locking action of the end of lever 106 on the disc 112 which is rigidly affixed to the shaft 52. It is to be noted that the capsule 32 will float momentarily as it is being filled with water and as the nose cone 34 falls away from the nose 40 of the capsule 32 pulling the coiled lead 36 to its full length.

The block 96 has centrally potted therein a full revolution potentiometer 120. The shaft 52 drives the potentiometer wiper 360 degrees around and against a circularly arranged resistance element of the potentiometer 120. A gap of, for example, approximately 10 degrees separates the two ends of the circular resistance element. The shaft 52 extends up through a deep circular hole 122 and felt, oiled washers 124 are stacked onto the shaft 52 to provide a suitable water seal. The block 96 is also formed with an annular channel 126 which accommodates the flange 114 of the light chopper disc 112. A lamp 128 is located radially outside of the flange 114 before a mask 130 which is positioned between the lamp 128 and the flange 114. The mask 130 has two openings therein to direct light from the lamp 128 to respective light sensitive elements 132 and 134 through slits which are provided in two rows in the flange 114 to illuminate the light sensitive elements 132 and 134 corresponding respectively to the two rows. The elements 132 and 134 may be photosensitive or photoconductive devices.

FIGURE 4 is an unfolded plan view of the disc 112 taken along the line 4—4 as indicated in FIGURE 3. The flange 114 of the disc 112 is opaque to light except for slit 136 positioned in a radially inner (upper) row 138 and slits 140 positioned in a radially outer (lower) row 142 on the flange 114. The slit 136 produces a reset signal and the slits 140 produce count signals as used in this invention. These are, for example, 350 of the slits 140 which are equiangularly spaced over 350 degrees in the row 142. The slit 136 is located approximately midway in the 10 degrees space Y as indicated in FIGURE 4. The aperture 108 with its engaging end of lever 106 is angularly located in the same position as the slit 136. Thus, as the shaft 52 is turned by rotation of the propeller 50 (FIGURES 1 and 3), the disc 112 is also rotated and light pulses from lamp 128 are produced by the slits 136 and 140 respectively on the light sensitive elements 132 and 134.

Generally, the 350 light conducting slits 140 on the light chopper 110 can be selected to represent a temperature range of, for example, 35 degrees centigrade. When the circuit elements cooperating with the light chopper 110 and its light sensitive elements 132 and 134 are properly adjusted, each of the slits 140 would correspond to 0.1 degree centigrade of emperature change. The pitch of the blades of propeller 50 can be adjusted to make one complete revolution for a given distance of sink of the bathythermosphere 24 through the water. In this way, the slits 140 are utilized to relate sensed temperatures to specific temperatures and depths over the preselected range during each revolution, and the system is reset by the use of slit 136 and its light sensitive element 132 at approximately the beginning of each revolution.

FIGURE 5 is a block diagram of one form of my bathythermograph. The bathythermosphere 24 includes the propeller 50 which mechanically drives the light chopper 110 and the wiper of the potentiometer 120 as the bathythermosphere sinks in the water. The light from the source or lamp 128 is chopped by the slits 136 and 140 in the disc 112 (FIGURE 4) of the light chopper 110 to produce reset and count signals from the light sensitive elements 132 and 134 which are light-to-voltage converters. The outputs of the potentiometer 120, light sensitive element 134 and temperature sensitive element 44 are connected to a bridge network 144 which produces a temperature representative signal that also includes corresponding depth informaiton for the sensed temperatures. The output signal from the bridge network 144 is amplified by amplifier 146, and the amplified signal is used to frequency modulate a voltage controlled oscillator 148. The output of the light sensitive element 132 is also applied to the oscillator 148 as a reset signal. The output signal of the element 132 is preferably opposite in polarity to the output signal from the amplifier 146 in order to facilitate handling and distinguishment of the two signals. The reset signal is a positive pulse signal and each count signal is a negative pulse signal, for example.

The frequency modulated output of the oscillator 148 is amplified by power amplifier 150 and applied to a transmitter 152. The output of the transmitter 152 includes the electrodes 78 and 90 which produce the electromagnetic signal in the water. For sea water, which is a conductive medium, considerable conduction currents should be taken into account in this invention, and the electromagnetic signal is generally a space damped wave having a velocity of propagation dependent upon frequency, and having electric and magnetic vectors which are not in phase with each other. The production, transmission and reception of the electromagnetic signal is more fully shown, described and claimed in a copending application of Harold R. Monroe and Vadim N. Erdman for "Underwater Communication System," Serial No. 348,614, filed March 2, 1964.

For best reception, the electrodes 62 and 64 connecting with the receiver and recorder unit 26 on board the ship 30 are shaped and arranged geometrically similar to the electrodes 90 and 78 of the bathythermosphere 24. The electrodes 62 and 64 are connected to a bandpass filter 154 which passes the frequency modulated carrier and its side bands, and filters out noise. The carrier and side bands are amplified by amplifier 156 and fed to a discriminator 158. The output of the discriminator 158 is connected to a counter 160 which has both count and reset input connections that are respectively responsive to pulses of opposite polarities. The output of the counter 160 is applied to a suitable display device such as a reorder 162. The voltage controlled oscillator 148, power amplifier 150, transmitter 152, bandpass filter 154, amplifier 156, discriminator 158, counter 160 and recorder 162 can be all conventional units which are commercially available. The counter 160 can be, for example, a Model 361 Eput and Timer manufactured by the Berkeley Division of Beckman Instruments, Inc., of Richmond, California, and the recorder 161 can be a Model 1452 Printer manufactured by the same company.

FIGURE 6 is a circuit diagram which shows details of the bridge network 144 and of the related components that are connected therewith. The light chopper 110 is shown as a plane disc 164 which is positioned between a mask 166 and a mirror 168. This is a variation of the similar structure shown in FIGURE 3 but is, of course, functionally the same. The light from lamp 128, in this instance, passes through a central opening 170 in the mask 166 and is reflected by the mirror 168 back through apertures 172 and 174 respectively to photodiodes D1 and D2 which correspond to the light sensitive elements 132 and 134. The lamp 128 is energized when the pressure actuated switch 104 is closed by action of water pressure on diaphragm 176 when at a predetermined depth of, for example, six feet to supply B+ power to the lamp 128. Deflection of the diaphragm 176 sufficiently to close the switch 104 also withdraws the end on lever 106 from engaging the aperture 108 in the light chopper 110 and permits it to start rotating. The light chopper 110 has the arrangement of slits shown in FIGURE 4, and reset pulses are produced from photodiode D1 and count pulses are produced from photodiode D2.

When the switch 104 is closed, B+ power is supplied to photodiodes D1 and D2, and to transistors Q1 and Q2 which are connected in a Darlington current amplifier circuit. This power is also supplied to transistors Q3, Q4 and Q5 which are connected as a high gain, alternating current coupled amplifier with sufficient frequency response to easily pass the count pulses and at least the first four harmonics of the fundamental frequency component, for example. Typical frequency response would be 150 c.p.s. to 1600 c.p.s., not necessarily flat. The voltage gain is, for example, at least 1000 at 350 c.p.s. for the amplifier including the transistors Q3, Q4 and Q5. An adequate gain is important to maintain a proper resolution such as approximately 0.1% resolution of full scale measurement. Positive reset pulses are obtained on lead 178 when the resistance of the photodiode D1 drops in value when the slit 136 (FIGURE 4) passes light onto the photodiode D1. Positive pulses are also produced from the photodiode D2 for each of the slits 140. These positive pulses are amplified by the transistors Q1 and Q2, and appear on a lead 180.

The lead 180 is connected through a resistance R1 to the base of the transistor Q5 which is biased class B just at cutoff during conduction of the photodiode D2. The lead 180 is also connected to the bridge network 144. As can be seen in FIGURE 6, the lead 180 is connected to ground through the resistance of the null potentiometer 120. The bridge network 144 is a double bridge wherein the inner bridge 182 has two branches of series resistances. One branch includes the temperature sensitive resistance 44 in series with resistance R2, and the other branch includes a resistance R3 in series with resistance R4. The resistances R2, R3 and R4 are preferably equal in value. The junction between resistances R3 and R4 is connected to the lead 80, and the junction between resistances 44 and R2 is connected to ground.

The outer bridge 184 of the bridge network 144 has two branches of series resistances which are mutually related. One branch includes the resistance R5 of the left side of the null potentiometer 120 connected in series with the resistance R6 of the left side of zero adjustment potentiometer 186. The other branch includes the resistance R7 of the right side of potentiometer 120 connected in series with the resistance R8 of the right side of the potentiometer 186. The junction between resistances R7 and R8 is connected to the lead 180, and the junction between resistances R5 and R6 is connected to ground. The wipers of the potentiometers 120 and 186 constitute the ends of the outer bridge 184, and are connected respectively to corresponding ends of the inner bridge 182 through resistances R9 and R10, and resistance R11. The resistances R9 and R10 are connected in series, and are individually adjustable as shown to provide linearity and span adjustment for the system.

The output from the bridge network 144 is taken from essentially the ends of the inner and outer bridges 182 and 184. This output is obtained from the junction of resistances R9 and R10 through a negatively oriented diode rectifier CR1 in series with the primary winding T1a of transformer T1 to the common junction of the resistances R2, R4 and R11. The secondary winding T1b of the transformer T1 is connected to amplifier 146 which comprises three amplifier stages including transistors Q3, Q4 and Q5 each connected in a common emitter circuit as shown in FIGURE 6. The relative polarity of the transformer windings T1a and T1b is such that negative count pulses are obtained from the collector of the transistor Q5 and which appear on lead 188. The emitter of the transistor Q5 is connected to ground through a parallel resistance R12 and capacitance C1 network 190. This network 190 can, if desired, be replaced by the network 192 including two series diode rectifiers CR2 and CR3 oriented as shown. These diodes CR2 and CR3 are preferably silicon diodes and provide an alternate emitter network 192 which fixes the minimum conductive voltage required on the base of the transistor Q5 more certainly than the network 190, if this is necessary.

FIGURE 7 is a graph which illustrates a plot of water (ocean) temperature versus depth. Curve 194 indicates that water temperature generally drops (becomes colder) with increasing depth. The drop in temperature with depth is normally at a fairly uniform and gradual rate. However, there are certain layers of water in the ocean in which the temperature drops quite rapidly over a relatively short distance. Such a sharp temperature gradient or themocline 196 is indicated in FIGURE 7 and defines a temperature discontinuity layer of water in the ocean. The bathythermograph can be used, of course, to plot such thermoclines in the ocean.

In operation, the springs 58 (FIGURE 1) are disengaged from the apertures 46 in the fins 42 of the capsule 32 and the bathythermosphere is thrown overboard from the ship 30. The capsule 32 will tend to float momentarily as it is being filled with water through the ports 48. The nose cone 34 drops quickly away from the then floating capsule 32, extending the lead 36. The capsule 32 has a somewhat greater buoyancy than the nose cone 34 and these two units will thus maintain a fixedly spaced relationship as they both descend through the water. At a predetermined depth of say, one fathom, the water pressure on diaphragm 176 (FIGURE 6) causes the switch 104 to close and, at the same time, withdraws the end of lever 106 from the aperture 108 in light chopper 110. This then releases the light chopper 110 and permits the propeller 50 (FIGURES 3, 4, and 5) to drive the chopper disc 112 and the easily rotated wiper of the null potentiometer 120. Since a uniform sink rate is assumed, the propeller 50 may be replaced by a small motor which is energized through the switch 104, if desired.

Power from the battery 102 is supplied through the switch 104 to lamp 128 and the other components in the bathythermosphere 24. The wiper of the potentiometer 120 is positioned relative to the chopper disc 112 such that the wiper is approximately halfway between the two ends of the potentiometer resistance (not contacting the resistance) when the reset slit 136 is positioned to illuminate the photodiode D1 (FIGURES 4 and 6). The chopper disc 112 is preferably engaged by the end of lever 106 such that the wiper of the potentiometer 120 has just moved off the right end of the resistance R7 and just before the reset slit 136 has moved before the photodiode D1 to illuminate the same. Thus, as the chopper disc 112 and the wiper of the potentiometer 120 begin to turn by action of the propeller 50, a reset pulse is first generated to reset the counter 160 (FIGURE 5) in the receiver and recorder unit 26.

As the wiper of the potentiometer 120 is rotated in a clockwise direction and contacts the left end of the resistance R5, the photodiode D2 begins to produce count pulses each corresponding to a respective slit of the count slits 140 of the chopper disc 112. These count pulses are positive pulses which are amplified by the transistors Q1 and Q2, and applied between the centers of the bridge network 144. It can be easily seen from FIGURE 6 that the resistance of the potentiometer 120 or resistance R5 in series with resistance R7, is in parallel with the resistance of the temperature sensitive element 44 in series with the resistance R3.

If the element 44 has a negative temperature resistance coefficient as in many thermistors, its resistance is relatively low at the warmer water depths as compared to the resistance R3. In order for the bridge network 144 to balance, the resistance R5 should be relatively large compared to the resistance R7 so that essentially the parallel combinations of the resistances R5 and 44 is equal to that of the resistances R7 and R3. Thus, the wiper of the potentiometer 120 will be rotated a relatively long distance clockwise only at the warmer levels before a null is achieved from the output ends of the bridge network 144. None of the positive output pulses which pass through the initially high resistance R7 will be produced in the transformer winding T1a because of the negatively oriented diode CR1.

FIGURE 8 is a graph which illustrates the signal appearing across the primary winding T1a of the transformer T1 when the temperature sensitive element 44 is at a temperature in which its resistance is equal to that of resistance R3, and the inner bridge 182 is then balanced. In this instance, the bridge network 144 will be balanced for a null when the wiper of the potentiometer 120 is centered on its resistance such that the resistances R5 and R7 are then equal. Thus, as the wiper of the potentiometer 120 is rotated from its left end to its right end, negative output pulses Pn are produced during the first half and positive output pulses Pp are produced during the second half for the primary winding T1a of the transformer T1.

The positive output pulses Pp are blocked by the diode CR1 and only the negative output pulses Pn are transformed and appear in the secondary winding T1b. The polarity of the negative output pulses Pn are reversed by the polarities of the transformer primary and secondary windings T1a and T1b. The positive output pulses Pp following null would be applied to the primary winding T1a if they were not blocked by the diode CR1 from appearing in the primary winding T1a. These pulses Pp are therefore indicated in broken lines in FIGURE 8. The solid line negative pulses Pn before null in the primary winding T1a will produce negative count pulses on lead 188 from the amplifier 146. Note that each amplified positive pulse from the photodiode D2 is applied to the base of the transistor Q5 through the resistance R1. The transistor Q5 is thus enabled when the photodiode D2 conducts and disenabled when it is not conducting. All of the output pulses appearing on the lead 188 following amplification are of the same magnitude because the transistor Q5 is normally operated in saturation to cause clipping of substantially all of the pulses amplified by the amplifier 146.

The condition indicated in FIGURE 8 represents a certain temperature and resistance for the temperature sensitive element 44 at which the inner bridge 182 is balanced. If the temperature of the element 44 is higher or lower than this noted temperature, the inner bridge 182 will become unbalanced. A higher temperature for the element 44 will produce a lower resistance of the element 44 and a lower temperature will produce a higher resistance because of its negative temperature resistance coefficient. A null will be reached later than that indicated in FIGURE 8 if the temperature of the element 44 is higher than that corresponding to the condition illustrated, and a null will be reached earlier if the temperature of the element 44 is lower than that corresponding to the condition illustrated. Thus, a greater number of output pulses will be produced for a higher temperature of the element 44 than that corresponding to the condition illustrated in FIGURE 8, and a smaller number of output pulses will be produced for a lower temperature of the element 44 than that corresponding to the condition illustrated.

The graph of FIGURE 8 is, of course, considerably simplified for clarity of illustration since there are 350 pulses which are generated each cycle. The sawtooth envelope angle remains substantially the same with respect to the abscissa axis as the null point is shifted along the axis. The 350 pulses occupy the space equal to 350 degrees of a cycle, and during the remaining 10 degrees the reset pulse is produced. Since the positive reset pulse appears on lead 178 and not on the primary winding T1a of transformer T1, a hatched pulse 198 is indicated for each cycle in the graph of FIGURE 8 to represent the appearance of the reset pulse on lead 178. This reset pulse 198 is approximately of the same magnitude as the negative output pulses on lead 188.

The output pulses from the bridge network 144 are essentially taken from between the ends of the inner and outer bridges 182 and 184. The resistance R9 provides a linearity adjustment of the progressively changing or decreasing count pulses by varying the resistance R9 connecting the wiper of the potentiometer 120 to the diode CR1 and the primary winding T1a of the transformer T1. The adjusted relative value of resistance R9 with the resistances R5 and R7 will modify the magnitudes of the output pulses to compensate for any nonlinearity of the resistance of thermistor 44. Span adjustment is provided in a similar manner by the resistance R10 which modifies the output from the inner bridge 182 to be larger or smaller in magnitude such that a greater or lesser number of output pulses are produced before balance or null is achieved between the inner and outer bridges 182 and 184 over the desired operating range. The output count pulses are thus properly varied in number over a desired span of temperatures. Finally, zero adjustment of the output of the bridge network 144 is obtained by setting the wiper of the potentiometer 186 to establish the relative potential of the common junction of the resistances R2 and R4 with respect to ground.

By adjusting or having a pitch of the blades on the propeller 50 such that it makes one revolution for a predetermined distance of sink of the bathythermosphere 24 in the water, the precise depth at which the water temperature is given can also be established. If the bathythermosphere 24 sinks F feet for each revolution of the propeller 50, the depth Ds at which each temperature is recorded will be approximately F feet deeper than the last recorded temperature. Reset pulses are, of course, produced for each revolution of the propeller 50. By adjusting the pressure switch 104 so that the chopper disc 112 only begins to turn at a depth of F feet, the depth Ds in feet at each sample of temperature is given closely by the following relationship.

$$Ds = (S + Ts/N)F \qquad \text{(Eq. A)}$$

where:

S is the temperature sample number as given consecutively from the start.

Ts is the recorded temperature given in count pulses at that sample number.

N is the number of count slits in the chopper disc 112 uniformly spaced through the resistance arc portion of the null potentiometer 120.

F is the distance in feet that the bathythermosphere 24 uniformly sinks for each revolution of the propeller 50.

The total number of count pulses for each cycle or sample of water temperature is totaled by the counter 160 (FIGURE 5) to give the final temperature when null is reached on the potentiometer 120. The water temperature could vary slightly as the bathythermosphere 24 is sinking to vary the null position (FIGURE 8) along the abscissa axis slightly. However, once the null point is reached, and passed, the totaled count pulses will give the exact temperatures Ts at the depth Ds as given by Equation A above. Since a reset pulse is produced at the beginning of each cycle, or each F distance, the temperature sample number S is readily provided from the tabulated results on the recorder 162 indicated in FIGURE 5. Actually, as mentioned previously in connection with the example shown in FIGURE 4, the reset slit 136 is located 5 degrees from the first and last count slits 140. Thus, where 350 count slits are equiangularly spaced over 350 degrees in the row 142 to represent a temperature range of 35 degrees centigrade, the depth Ds will be given exactly by Equation A if 5 additional count pulses are added to Ts and 10 additional count slits are added to N to account for the 10-degrees space Y. Equation A, however, is quite accurate for all practical purposes. The means generating the count and reset pulses comprises a signal generator which produces output signals representative of discrete, known increments of depth from which bathythermosphere depth can be established through an appropriate summation of these output signals.

FIGURE 9 is a circuit diagram of a modified version of my invention. The version of bathythermograph described above provides an accuracy of 0.1% or better and is also comparatively more expensive than the low cost bathythermograph illustrated in FIGURE 9. The bathythermosphere portion 200 shown in FIGURE 9 is considerably less complex than the similar portion (see FIGURE 5 and FIGURE 6) of the more accurate bathythermograph previously described. However, in most applications of the bathythermograph, a much lower accuracy than that which the previously described system is capable of, is usually more than adequate. Further, in measuring temperatures of large bodies of water, the bathythermosphere portion should be a low cost, expendable device. The bathythermograph shown in FIGURE 9 is not complex in structure and provides an operating accuracy of approximately 3% of full scale of the temperature span or range covered by the bathythermograph. This is, however, entirely adequate for many applications of the invention.

The bathythermosphere portion 200 generally includes a transformer T2, transistors Q6 and Q7, battery 202 and a temperature sensitive element 204 connected in an oscillator circuit as shown in FIGURE 9. The transformer T2 has two main windings T2a and T2b, two hold windings T2c and T2d, and an output winding T2e. The positive terminal of the battery 202 is connected through a cam operated switch 206 to the common junction (center tap) of the main windings T2a and T2b. The switch 206 is opened once for each revolution of the propeller 208 which is similar to the propeller 50 (FIGURE 3). The propeller 208 drives a cam 210 instead of a null potentiometer, and the cam 210 operatively opens the switch 206 to produce a momentary reset signal once for each revolution of the propeller 208. The other ends of the main windings T2a and T2b are respectively connected to the collectors of the transistors Q6 and Q7. The emitters of the transistors Q6 and Q7 are connected to the negative terminal of the battery 202 as shown. A pressure operated diaphragm mechanism 212 actuates a lever 214, the end of which engages hole 216 in the cam 210 until a predetermined pressure is reached to pivot the end of the lever 214 out of the hole 216.

The base of the transistor Q6 is connected through the hold winding T2c to a coupling network including resistance R13 in parallel with capacitance C2 and back to the negative terminal of the battery 202 through the temperature sensitive element 204. Similarly, the base of the transistor Q7 is connected to another coupling network including resistance R14 in parallel with capacitance C3 and back to the negative terminal of the battery 202 through the same temperature sensitive element 204. The negative terminal of the battery 202 is also connected to the common junction of the main windings T2a and T2b through series connected resistances R15 and R16. The common junction between the resistances R15 and R16 is connected to the end of the element 204 which is connected to the coupling networks. The resistance R15 is adjustable to provide a calibration adjustment for the device. Output electrodes 218 and 220 are connected to the ends of the output winding T2e and may be similar to the electrodes formed by layers 78 and 90 (FIGURES 2 and 3) in the previously described system.

The receiver and recorder portion 222 can be connected and carried on board a vessel similar to the ship 30 of FIGURE 1. This portion 222 includes electrodes 224 and 226 which are similar to the electrodes 62 and 64 of FIGURE 1. These electrodes 224 and 226 are connected to a bandpass filter 228 which, in turn, is connected to alternating current amplifier 230 as indicated in FIGURE 9. The output of amplifier 230 is applied to a frequency counter 232 and to a detector or rectifier 234. The bandpass filter 228 is similar to the bandpass filter 154 of FIGURE 5, and the amplifier 230 is similar to the amplifier 156. The output of the frequency counter 232 is applied to one channel of a two channel recorder 236, and the output of the detector 234 is amplified by direct current amplifier 240 and applied to the control coil of a relay 242. When the relay 242 is energized by the output of amplifier 240, the relay contacts are opened, but when there is no output from the amplifier 240, the relay contacts are closed which permits current to flow through resistance R17 and provide a signal to the second channel of the recorder 236.

In operation, the cam 210 is locked in position by the end of the lever 214 engaging the hole 216. In this position, the switch 206 is held in an opened condition. When the bathythermosphere portion 200 has sunk to a predetermined depth in the ocean, for example, the lever 214 is pivoted upwards by the diaphragm mechanism 212 and permits the propeller 208 to turn and drive the cam 210. The switch 206 closes and connects the water activatable or hermetically sealed battery 202 to the oscillator circuit and causes it to oscillate. An oscillating output signal is produced at the electrodes 218 and 220. The frequency of this oscillating signal is directly proportional to water temperature sensed by the temperature sensitive element 204 which has a negative temperature resistance coefficient. An electromagnetic signal is thus produced and propagated through the water medium, and received by the electrodes 224 and 226 of the receiver and recorder portion 222.

FIGURE 10 is a graph which illustrates the output signal produced at the electrodes 218 and 220. As the bathythermosphere portion 200 sinks in the water, the water temperature generally drops and the frequency of the output signal therefore becomes progressively lower. The change in frequency is, of course, exaggerated in FIGURE 10 for clarity of illustration. It is also depicted, merely for purposes of illustration, that the water temperature changes in discrete steps regularly after each revolution of the propeller 208. Thus, there is an absence of any signal after each period of a number of cycles of a particular frequency. These gaps 244 are caused by the opening of the switch 206 by the cam 216 and serve as sample signals to provide a temperature sample number record in the recorder 236.

The bandpass filter 228 filters out the noise portion of the signal received by the electrodes 224 and 226, and the filtered signal is amplified by amplifier 230. The amplified frequency signal from the amplifier 230 is measured by the frequency counter 232 which produces a digital output signal that can be numerically recorded on one channel of the recorder 236. A data handling system which is commercially available and can be used for both the frequency counter 232 and recorder 236, by suitable connections of system components, is the Type DY-552 Basic System manufactured by Dymec Division of Hewlett Packard Company of Palo Alto, California. The detector 234 rectifies the alternating current signals and produces an output which is amplified by amplifier 240 to energize the control coil of relay 242. This opens the relay contacts so that the voltage B+ is not applied to the resistance R17 and the second channel of the recorder 236.

During one of the gaps 244 (FIGURE 10), however, the detector 234 does not produce any output which can be amplified by the amplifier 240 and the control coil of the relay 242 is de-energized, permitting the relay contacts to close. The voltage B+ causes a current to flow through the resistance R17 and the voltage developed across it is applied to the second channel of the recorder 236. This produces a suitable marking or tabulation in the second channel of the recorder, which marking is related to the temperature data tabulated in the first channel. Actually, the second channel giving the temperature sample number data would be unnecessary if the gaps 244 are made sufficiently wide so that definite gaps or separations in successive tabulated entries in the first channel are readily evident to indicate distinct temperature samples. The distinct samples can then be easily summed to determine the depth at which the corresponding temperature is sampled and recorded. The exact depth can be closely approximated for any particular recorded temperature within a series of temperatures recorded over each revolution of the propeller 208, by measuring the proportional location of that particular recorded temperature within a sample group and adding to the total number of preceding sample groups and multiplying the total by the sink distance per group. The sink distance of the bathythermosphere portion 200 per sample group must, of course, be properly established by adjustment of the blade pitch, for example, of the propeller 208 and therefore known.

The commercially available transistors Q6 and Q7 are not normally identical in characteristics and, for this reason, the calibration adjustment resistance R15 is desirable to permit suitable setting of the operating conditions of the transistors Q6 and Q7 in conjunction with the characteristics of the temperature sensitive element 204 to produce an oscillation frequency which varies in direct proportion to the temperature of the element 204. The oscillator circuit varies in frequency of oscillation inversely with the resistance of the element 204 which has a negative temperature resistance coefficient. When one transistor is conducting, the other one is held non-conducting due to the polarities of the main and hold windings of the transformer T2. The transistors reverse their conducting and non-conducting states as the induced voltages in the windings are developed to appropriate magnitudes at a rate dependent upon the temperature variable resistance of the element 204. The transformer T2 is an ordinary transformer although it can be a saturable core one for greater output efficiency.

FIGURE 11 is a longitudinal sectional view showing an alternate commutator device for replacing the light chopper 110 and its associated lamp 128 and light sensitive elements 132 and 134 indicated in FIGURE 3. Block 246 corresponds to the block 96 and is preferably of epoxy, potting various electrical elements 248 which correspond to the circuit elements 94. Potentiometer 250 corresponds, of course, to the null potentiometer 120 and has a vertically extending shaft 252 which can be driven by a suitable device such as the propeller 50 or a small electrical motor (not shown).

The shaft 252 is sealed by washer seal 254 which serves more as a shaft alignment device than seal and can be omitted if desired. The shaft 252 mounts a cup-shaped, commutator disc 256 which corresponds to the disc 112 of FIGURE 3. The disc 256 is affixed to the shaft 252 within a recessed region 258 of the block 246 and is immersed in a liquid 260 which is preferably a light oil. The liquid 260 is enclosed within the recessed region 258 by a flexible diaphragm 262 which is suitably secured at its edges to the sides of the recessed region 258 formed by the upper walls of the block 246. The shaft 252 passes through a seal 264 located at the center of the diaphragm 262 as shown in FIGURE 11.

Affixed to the shaft 252 above the seal 264 is an arm 266 which extends radially outward. The end of the arm 266 is forked or can have an aperture therein so that the arm 266 can be engaged by the end of lever 268 of a pressure switch 270. The lever 268 corresponds to lever 106 of pressure switch 104 which corresponds to the switch 270. The function of the pressure switch 270 can be similar to that previously described for the pressure switch 104. When the water pressure reaches a predetermined value, the lever 268 is raised to release the arm 266.

The commutator disc 256 is made of non-conducting material and has an annular, slight groove 272 on its upper surface near the periphery thereof. The end of a wiper arm 274 rides in the groove 272 which has a conducting surface that connects with conducting segments 276 and 278. The segments 276 and 278 are positioned respectively in a normally upper and a normally lower row which are contacted by brushes 280 and 282. The wiper arm 274 is preferably connected to a lead 284 connecting with a voltage supply B+ and the brush 280 is connected to a lead 286 which corresponds to lead 180 of FIGURE 6. The lead 286 is connected to a bridge network such as the bridge network 144. The brush 282 is connected to a lead 288 which corresponds to the reset lead 178 of FIGURE 6.

FIGURE 12 is a perspective view of the commutator disc 256. The disc 256 is mounted on shaft 252 and is rotated thereby. The wiper arm 274 rides in the annular, conducting groove 272 which is electrically connected to the conducting segments 276 and 278. The segments 276 are arranged in a normally upper row and correspond to the slits 140 of the light chopper 110 shown in FIGURE 4. The segment 278 is positioned in a normally lower row and corresponds to the slit 136. Brush 280 contacts the segments 276 and the brush 282 contacts the segment 278 as the disc 256 is rotated to produce pulses on the leads 286 and 288.

The segments 276 and 278 can be similar in number and arranged in the same manner as the slits 140 and 136 shown in FIGURE 4. The metallic segments in the flange of the disc 256 increases the moment of inertia of the disc 256 and produces a flywheel effect which causes the disc 256 to maintain a smoother and more uniform rotation to some extent. The oil filled chamber formed with the bellows diaphragm 262 protects the electrical contacts from salt water contamination. The disc 256 and its electrical contacts are also protected from the water pressure at great depths in the ocean within the chamber. Moreover, the bellows diaphragm 262 provides compensation for oil loss due to leakage from the chamber or any slight compression of the oil and contiguous structure at depth.

The foregoing illustrative examples of my invention may be obviously modified in various ways without altering the principles involved in this invention. It is, therefore, to be understood that the particular embodiments of my invention described above and shown in the drawings are merely illustrative of and not restrictive on the broad invention, and that various changes in design, structure and arrangement may be made without departing from the spirit and scope of the appended claims.

I claim:
1. A bathythermograph comprising:
   a transmitting system including
      a bathythermosphere having means for sensing temperature of a surrounding fluid, means responsive to descent motion of said bathythermosphere for establishing its depth as it sinks in the surrounding fluid, and means for producing an electromagnetic signal carrying both the sensed temperature and established depth information in a correlated relationship through the surrounding fluid; and
   a receiving system including
      means for receiving the electromagnetic signal produced in the surrounding fluid, and means for converting the information carried in the received electromagnetic signal into visual information.

2. A bathythermograph as defined in claim 1 wherein said bathythermosphere comprises a capsule portion and a nose cone portion which is separable to a predetermined distance from said capsule portion.

3. A bathythermograph as defined in claim 1 wherein the electromagnetic signal carries the sensed temperture and established depth information on an essentially digital basis.

4. A bathythermograph as defined in claim 1 wherein the electromagnetic signal carries the sensed temperature information on an essentially frequency basis.

5. In a bathythermograph, a bathythermosphere comprising:
   a capsule including a first electrode associated therewith;
   a nose cone including a second electrode associated therewith, said second electrode being separable at a predetermined distance from said first electrode;
   means associated with said capsule for sensing temperature of a surrounding fluid;
   means responsive to descent motion of said capsule for establishing its depth as it sinks in the surrounding fluid; and
   means operatively connected with said first and second electrodes for producing an electromagnetic signal carrying both the sensed temperature and established depth information in a correlated relationship through the surrounding fluid.

6. Apparatus as defined in claim 5 wherein said depth establishing means includes a signal generator which produces output signals representative of discrete, known increments of depth whereby capsule depth can be established through summation of the output signals.

7. Apparatus as defined in claim 6 wherein said signal generator comprises driven means for producing a pulse when driven a predetermined amount, and means for driving said driven means proportionately with increasing depth of said capsule.

8. Apparatus as defined in claim 7 wherein said driven means comprises an opaque light chopper having a plurality of transparent slits thereon for chopping light from a lamp to photosensitive means whereby a pulse is produced from the photosensitive means for each slit in said chopper.

9. Apparatus as defined in claim 7 wherein said driven means comprises a commutator disc having a plurality of conducting segments thereon connected to a signal source and adapted to engage an electrical contact with rotation of said disc whereby an output signal is produced from the electrical contact as it engages each of said segments.

10. Apparatus as defined in claim 7 wherein said driving means comprises a propeller attached to said capsule and adapted to be rotated with downward descent of said capsule.

11. Apparatus of the class described, comprising:
   a transmitting system including
      means for producing a periodic signal at a rate which is representative of sink rate of a bathythermosphere in a surrounding fluid,
      means for sensing temperature of the surrounding fluid, and
      means for producing an electromagnetic signal in the surrounding fluid carrying information of the sensed temperature between successive occurrences of the periodic signal; and
   a receiving system including
      means for receiving the electromagnetic signal produced in the surrounding fluid, and
      means for converting the information carried in the received electromagnetic signal into visual information.

12. Apparatus as defined in claim 11 wherein said periodic signal producing means comprises driven means for producing a distinctive signal when driven a predetermined amount, and means for driving said driven means proportionately with sink rate of the bathythermosphere.

13. Apparatus as defined in claim 12 wherein said driven means includes a cam-operated switch which is periodically opened to produce a gap signal, and said driving means includes a propeller attached to the bathythermosphere and adapted to drive said cam-operated switch.

14. In a bathythermosphere, the combination of:
   means for sensing temperature of a fluid surrounding the bathythermosphere;
   means responsive to descent motion of the bathythermosphere for establishing its depth as it sinks in the surrounding fluid; and
   means for producing an electromagnetic signal carrying both the sensed temperature and established depth information in a correlated relationship through the surrounding fluid.

15. Apparatus as defined in claim 14 wherein the electromagnetic signal carries the sensed temperature and established depth information on an essentially digital basis.

16. Apparatus as defined in claim 14 wherein the electromagent signal carries the sensed temperature information on an essentially frequency basis.

17. In a bathythermosphere, the combination of:
   means responsive to descent motion of said bathythermosphere for establishing its depth as it sinks in a surrounding fluid;
   means for measuring temperature of the surrounding fluid at established depths of the bathythermosphere; and
   means for producing an electromagnetic signal carrying both the measured temperature and established depth information in a correlated relationship through the surrounding fluid.

18. Apparatus as defined in claim 17 wherein said temperature measuring means includes a temperature sensitive element having a resistance variable with fluid temperature connected in an inner bridge, a null potentiometer connected in an outer bridge and having its resistance varied at a rate proportional to sink rate of the bathythermosphere, and output means connected to said inner and outer bridges for producing an output signal until said bridges become balanced whereby duration of the output signal is representative of both the fluid temperature and depth of the bathythermosphere.

19. Apparatus as defined in claim 17 wherein said depth establishing means includes a signal generator which produces distinctive output signals representative of discrete known increments of increases in depth of the bathythermosphere whereby depth can be established through summation of the output signals.

20. Apparatus as defined in claim 19 wherein said signal generator comprises an oscillator circuit including means for producing a distinctive signal from its output at a rate which is proportional to sink rate of the bathythermosphere, and said temperature measuring means includes a temperature sensitive element connected in said oscillator circuit and having a resistance variable with fluid temperature, said oscillator circuit producing an output signal which is variable in frequency with the resistance of said temperature sensitive element whereby the frequency of the output signal is representative of fluid temperature and the distinctive signals in the output signal establishes the depth of the bathythermosphere.

References Cited by the Examiner

UNITED STATES PATENTS

| | | | |
|---|---|---|---|
| 3,098,993 | 7/1963 | Coop | 73—170 X |
| 3,119,090 | 1/1964 | Springer | 73—170 X |
| 3,135,943 | 2/1964 | Richard | 73—170 X |

LOUIS R. PRINCE, *Primary Examiner.*

D. M. YASICH, *Assistant Examiner.*